Jan. 16, 1945.   R. E. BAILEY ET AL   2,367,191
TUBE SPLICER
Filed Nov. 23, 1942

INVENTORS
R.E.BAILEY
A.C.TRICKER
BY
ATTORNEYS

Patented Jan. 16, 1945

2,367,191

UNITED STATES PATENT OFFICE 2,367,191

TUBE SPLICER

Ralph E. Bailey and Albert C. Tricker, Portland, Oreg.

Application November 23, 1942, Serial No. 466,706

1 Claim. (Cl. 285—193)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a splicer particularly useful in joining a pair of tubes, such as mailing tubes or other tubes formed from a material which may be readily nicked or indented.

It frequently happens that available mailing or packaging tubes for maps, charts, etc., are not of sufficient length to accommodate the rolled map or chart, and it is necessary to splice a pair of the tubes. It has been customary to form the splice of Scotch tape or the like. This is time-consuming, and it does not result in a rigid joint.

It is the object of this invention to produce a cheap and simple tube splicer which can be quickly installed and removed and which results in a secure and rigid joint.

Figure 1:
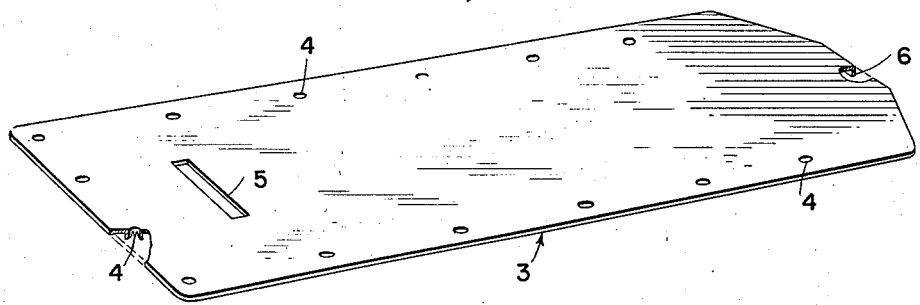
Figure 2:
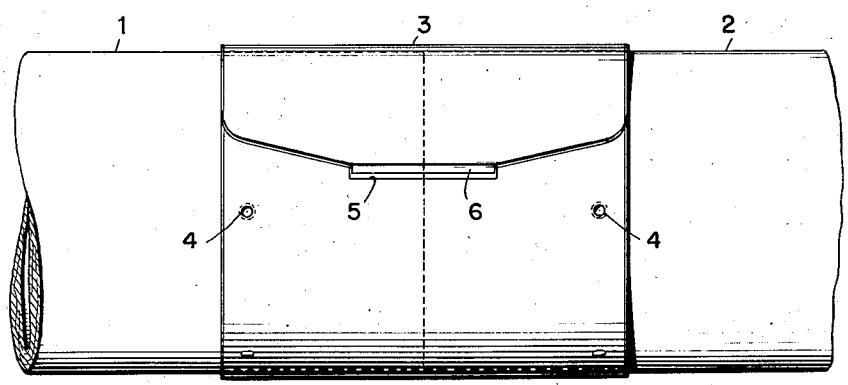

The invention is disclosed in the following specification and attached drawing, in which Figure 1 is a three-dimensional view of the splicer; and Figure 2 is an elevation of a pair of tubes spliced in accordance with the invention.

Referring to the drawing, tubes 1 and 2 are abutted end to end and are spliced or held together by splicer 3. The splicer is made from a strip of suitable sheet material, such as thin spring steel, sufficiently flexible to be readily folded or wrapped around the tubes. The strip is punched with a plurality of indentations to form biting teeth 4 to engage the surfaces of the tubes and bite into them to make a firm securement. One end of the strip is provided with an aperture 5 and the other end with a portion bent normal to the strip forming a hook 6 so spaced from the aperture that when the splicer is squeezed tightly around a pair of tubes the end having the hook overlaps the other end, and the hook engages the aperture to lock the splicer on the tubes.

To join a pair of tubes, they are placed end to end and the splicer, which may be partially prefolded, is folded about them at the joint, and is squeezed down to cause the teeth to bite into the tubes and the bent portion to engage the aperture. The splicer also may be readily removed by disengaging the bent portion from the aperture.

Having thus described the invention, what is claimed is:

In combination, a pair of tubes formed of a material which is easily nicked or indented and means for joining them, said means comprising a strip of flexible material folded about the tubes with one end of the strip overlapping the other, an aperture formed through the strip near the overlapped end, the overlapping end being provided with bent portion forming a hook so spaced from the aperture that when the splicer is squeezed onto the tubes the hook will engage in the aperture to lock the spliced tubes together, and a plurality of punched indentations in the strip forming inwardly extending teeth bitingly engaging the surfaces of the tubes.

RALPH E. BAILEY.
ALBERT C. TRICKER.